United States Patent
Bassi et al.

(10) Patent No.: US 7,714,943 B2
(45) Date of Patent: May 11, 2010

(54) ULTRA-THIN IMAGE PROJECTION SYSTEM

(75) Inventors: Zorawar S. Bassi, Markham (CA); Gopal Ramachandran, Los Gatos, CA (US); Gregory A. Prior, San Jose, CA (US)

(73) Assignee: Geo Semiconductor Inc., Santa Clara, CA (US)

( * ) Notice: Subject to any disclaimer, the term of this patent is extended or adjusted under 35 U.S.C. 154(b) by 856 days.

(21) Appl. No.: 11/585,107

(22) Filed: Oct. 24, 2006

(65) Prior Publication Data

US 2007/0035670 A1 Feb. 15, 2007

Related U.S. Application Data

(63) Continuation-in-part of application No. 10/459,426, filed on Jun. 12, 2003, now Pat. No. 7,239,360, application No. 11/585,107, and a continuation-in-part of application No. 10/752,955, filed on Jan. 7, 2004, now Pat. No. 7,384,158, application No. 11/585,107, and a continuation-in-part of application No. 11/331,043, filed on Jan. 13, 2006.

(60) Provisional application No. 60/387,597, filed on Jun. 12, 2002, provisional application No. 60/438,675, filed on Jan. 8, 2003.

(51) Int. Cl.
*H04N 5/74* (2006.01)
*G03B 21/28* (2006.01)

(52) U.S. Cl. .......................................... 348/744; 353/70

(58) Field of Classification Search ......... 348/744–747, 348/781–784, 787, 806; 353/70, 77, 69, 353/98, 66; 359/460, 451, 449

See application file for complete search history.

(56) References Cited

U.S. PATENT DOCUMENTS 4,003,080 A  1/1977  Maiman et al.

(Continued)

FOREIGN PATENT DOCUMENTS

CA  2381093  2/2001

(Continued)

OTHER PUBLICATIONS

Shikama et al., "46.2: Optical System of Ultra-Thin Rear Projector Equipped with Refractive-Reflective Projection Optics," SID 02 Digest, May 19-24, 2002, pp. 1250-1253.

*Primary Examiner*—Paulos M Natnael
(74) *Attorney, Agent, or Firm*—Sughrue Mion, PLLC

(57) ABSTRACT

An ultra-thin rear projection display system (RPDS) is disclosed. The system uses a small flat mirror, a small non-rotationally symmetric mirror and a larger non-rotationally symmetric mirror to achieve a D-to-d ratio of around 11:1 while rendering a significantly distortion free image on the screen. The first two mirrors are significantly smaller than the size of the screen, while the third mirror is significantly larger than the first two mirrors but smaller than the screen. In one embodiment, the lens and light engine are positioned horizontally to one side and, in another example, the lens and light engine are positioned vertically, projecting downwards. In one example, an image processor is used to correct for the remaining distortions. In another example, the system is adapted such that the light rays forming the projected image are within a certain range of angles such that a TIR Fresnel lens could be used to collimate the image.

20 Claims, 21 Drawing Sheets

U.S. PATENT DOCUMENTS

| | | |
|---|---|---|
| 5,185,667 A | 2/1993 | Zimmermann |
| 5,274,406 A | 12/1993 | Tejima et al. |
| 5,319,744 A | 6/1994 | Kelly et al. |
| 5,394,198 A | 2/1995 | Janow |
| 5,422,691 A | 6/1995 | Ninomiya et al. |
| 5,465,121 A | 11/1995 | Blalock et al. |
| 5,477,394 A | 12/1995 | Shibazaki |
| 5,559,905 A | 9/1996 | Greggain et al. |
| 5,594,676 A | 1/1997 | Greggain et al. |
| 5,622,418 A | 4/1997 | Daijogo et al. |
| 5,634,704 A | 6/1997 | Shikama et al. |
| 5,671,993 A | 9/1997 | Shikama |
| 5,760,875 A | 6/1998 | Daijogo et al. |
| 5,795,046 A | 8/1998 | Woo |
| 5,883,476 A | 3/1999 | Noguchi et al. |
| 5,973,848 A | 10/1999 | Taguchi et al. |
| 6,208,468 B1 * | 3/2001 | Togino et al. ............. 359/637 |
| 6,233,024 B1 * | 5/2001 | Hiller et al. ............. 348/744 |
| 6,305,805 B1 | 10/2001 | Liebenow |
| 6,367,933 B1 | 4/2002 | Chen et al. |
| 6,392,821 B1 | 5/2002 | Benner, Jr. |
| 6,416,186 B1 | 7/2002 | Nakamura |
| 6,456,340 B1 | 9/2002 | Margulis |
| 6,457,834 B1 | 10/2002 | Cotton et al. |
| 6,461,001 B2 | 10/2002 | Okamori et al. |
| 6,467,910 B1 | 10/2002 | Sato |
| 6,498,620 B2 | 12/2002 | Schofield et al. |
| 6,516,151 B2 | 2/2003 | Pilu |
| 6,520,646 B2 | 2/2003 | Rodriguez et al. |
| 6,520,647 B2 | 2/2003 | Raskar |
| 6,561,649 B1 | 5/2003 | Burstyn |
| 6,568,814 B2 | 5/2003 | Rodriguez et al. |
| 6,626,541 B2 * | 9/2003 | Sunaga ..................... 353/69 |
| 6,631,994 B2 | 10/2003 | Suzuki et al. |
| 6,761,457 B2 * | 7/2004 | Wada et al. ............. 353/70 |
| 6,795,255 B2 | 9/2004 | Reinecke et al. |
| 6,879,444 B2 * | 4/2005 | Matsuo ..................... 359/649 |
| 6,896,375 B2 * | 5/2005 | Peterson et al. ............. 353/66 |
| 6,898,308 B2 | 5/2005 | Mojsilovis et al. |
| 7,048,388 B2 * | 5/2006 | Takaura et al. ............. 353/99 |
| 7,239,360 B2 * | 7/2007 | Bassi et al. ............. 348/745 |
| 7,259,801 B2 * | 8/2007 | Conner et al. ............. 348/744 |
| 7,262,816 B2 * | 8/2007 | McDowall et al. ........... 348/745 |
| 7,384,158 B2 * | 6/2008 | Ramachandran et al. ...... 353/70 |
| 7,549,755 B2 * | 6/2009 | Suzuki ..................... 353/77 |
| 7,553,031 B2 * | 6/2009 | Hisada et al. ............. 353/70 |
| 2001/0050258 A1 * | 12/2001 | Gargas ..................... 210/748 |
| 2001/0050758 A1 | 12/2001 | Suzuki et al. |
| 2001/0050812 A1 | 12/2001 | Takahashi et al. |
| 2002/0008853 A1 | 1/2002 | Sunaga |
| 2002/0024636 A1 | 2/2002 | Okamori et al. |
| 2002/0051095 A1 | 5/2002 | Su |
| 2002/0154418 A1 | 10/2002 | Shikama |
| 2003/0072077 A1 * | 4/2003 | Peterson et al. ............. 359/460 |
| 2003/0231261 A1 | 12/2003 | Bassi et al. |
| 2003/0231361 A1 * | 12/2003 | Kato et al. ............. 358/501 |
| 2004/0032982 A1 | 2/2004 | Hiller et al. |
| 2004/0046944 A1 * | 3/2004 | Suzuki et al. ............. 353/77 |
| 2004/0141157 A1 | 7/2004 | Ramachandran et al. |
| 2007/0165192 A1 * | 7/2007 | Prior et al. ............. 353/78 |

FOREIGN PATENT DOCUMENTS

| | | |
|---|---|---|
| CA | 393 022 | 4/2002 |
| EP | 0 777 198 | 6/1997 |
| EP | 1 205 791 | 5/2002 |
| JP | 61 023130 | 1/1986 |
| JP | 03-241331 | 10/1991 |
| JP | 09 081785 | 3/1997 |
| JP | 09 138349 | 5/1997 |
| JP | 11-146307 | 5/1999 |
| JP | 2000 19647 | 1/2000 |
| JP | 2000 81593 | 3/2000 |
| JP | 2001 42461 | 2/2001 |
| JP | 2002 174853 | 6/2002 |
| WO | WO 00/21282 | 4/2000 |
| WO | WO 02 07434 | 1/2002 |
| WO | WO 03/107090 | 12/2003 |

* cited by examiner

ULTRA-THIN IMAGE PROJECTION SYSTEM

The present United States patent application is a continuation-in-part of U.S. patent application Ser. No. 10/459,426 filed Jun. 12, 2003 which claimed priority from provisional U.S. Patent Application No. 60/387,597 filed Jun. 12, 2002, U.S. patent application Ser. No. 10/752,955 filed Jan. 7, 2004 which claimed priority from provisional U.S. Patent Application No. 60/438,675 filed Jan. 8, 2003, and U.S. patent application Ser. No. 11/331,043 filed Jan. 13, 2006, all of the contents of which are incorporated by reference herein.

FIELD

Various embodiments are discussed relating to ultra-thin rear projection display systems.

BACKGROUND

Rear projection display systems with thin housings have been demonstrated or have been proposed. Two such applications are described in United States Patent Application Publication No. U.S.20030231261 and United States Patent Application Publication No. U.S.20040141157, both assigned to Silicon Optix Inc. In these prior art disclosures, the ratio of the screen diagonal to the thickness of the housing (the so-called D-to-d ratio) of the systems is about 6:1. It is desirable to push the D-to-d ratio even higher which is the subject matter of the current disclosure.

SUMMARY

The embodiments described herein provide in one aspect, a rear projection display system (RPDS) comprising:

a) a housing having a thickness;

b) a screen, having a screen diagonal and a screen normal direction, positioned at a front side of the housing;

c) a light engine placed inside the housing, having an illumination stage adapted to create a beam of light, at least one display panel adapted to modulate the beam of light to create an image, and a lens system having a focal length and adapted to project the created image forming a projected image consisting of light rays;

d) a non-rotationally symmetric first mirror placed inside the housing and in the optical path of said projected image, having dimensions significantly smaller than said screen diagonal, and having a horizontally convex curvature, and having a vertical curvature which is a function of the focal length of said lens system, such that for shorter focal length it is more concave and less convex, and for longer focal length, it is less concave and more convex, said first mirror adapted to reflect the projected image which is projected from said lens system; and e) a non-rotationally symmetric second mirror, placed inside the housing and in the optical path of said projected image, having dimensions significantly larger than said first mirror and smaller than said screen diagonal and having a vertical curvature which is a function of the size of the image in the absence of said second mirror relative to the size of the screen, such that for smaller image size it is convex and for larger image size it is concave, said second mirror adapted to reflect the projected image, which is reflected off of the first mirror, onto the screen to form a viewable image.

Further aspects and advantages of the embodiments described herein will appear from the following description taken together with the accompanying drawings.

BRIEF DESCRIPTION OF THE DRAWINGS

For a better understanding of the embodiments and/or related implementations described herein and to show more clearly how it may be carried into effect, reference will now be made, by way of example only, to the accompanying drawings which show at least one exemplary embodiment and/or related implementation in which.

Figure 1:
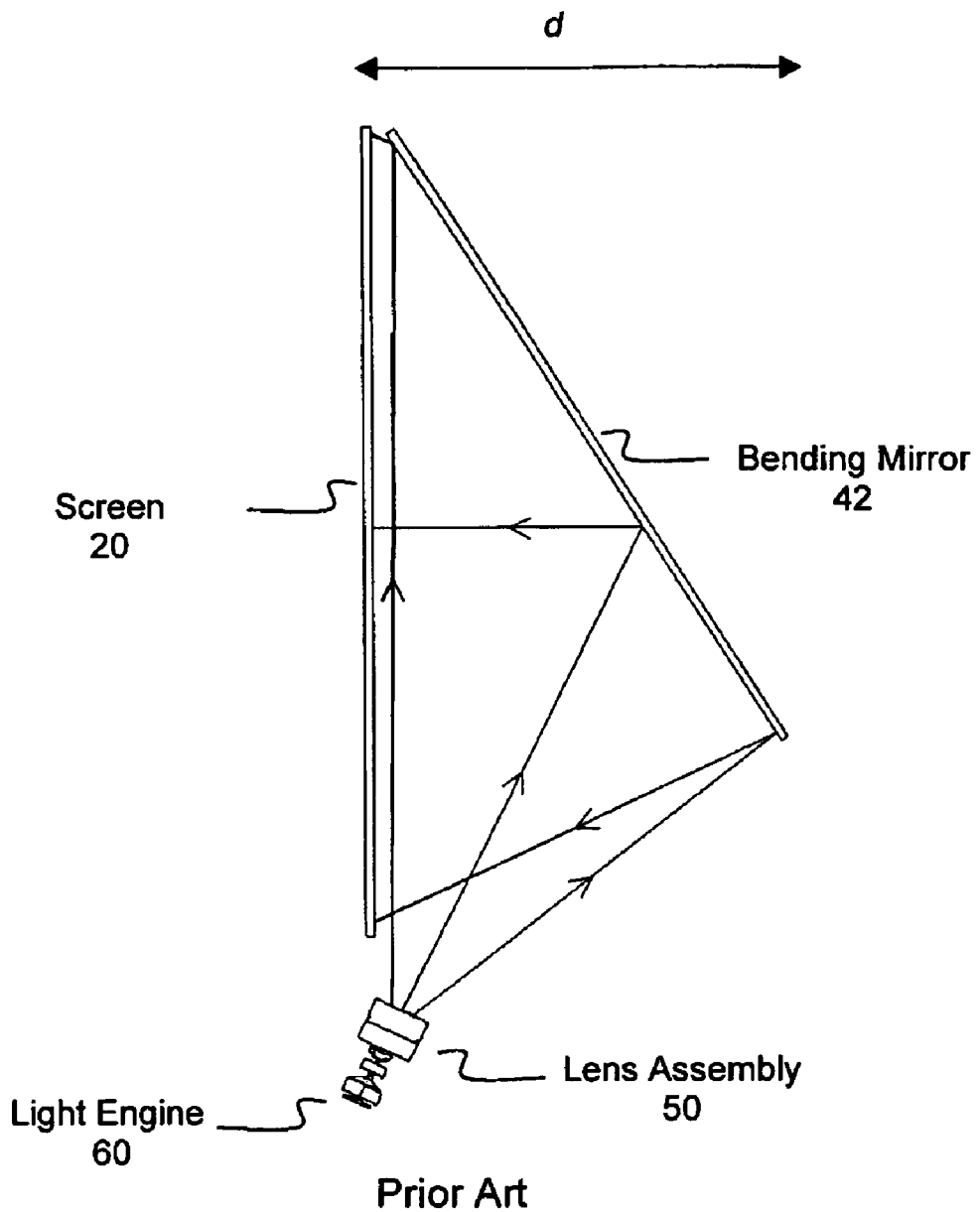
FIG. 1 is a schematic diagram of a prior art short-throw on-axis RPDS.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments and/or implementations described herein. However, it will be understood by those of ordinary skill in the art that the embodiments and/or implementations described herein may be practiced without these specific details. In other instances, well-known methods, procedures and components have not been described in detail so as not to obscure the embodiments and/or implementations described herein. Furthermore, this description is not to be considered as limiting the scope of the embodiments described herein, but rather to describe the structure and operation of the various embodiments and/or implementations described herein.

The general idea behind a rear projection display system (RPDS) is demonstrated by the prior art short-throw on-axis RPDS 10 shown in FIG. 1. A flat bending mirror 42 folds the on-axis light path, giving rise to a conventional thickness housing. It is well known that, for an RPDS to comply with desirable commercial standards, it must have a thin and compact housing. This "compactness" is quantified in terms of the "diagonal to depth ratio" or D-to-d ratio. The D-to-d ratio of a projection system is given by the screen diagonal length D (not shown) of a screen 20 divided by the thickness of the housing or projection distance d (shown in FIG. 1). The diagonal D is measured from the opposite corners of the screen 20. The D-to-d ratio is given by equation 1.

$$D\text{-to-}d \text{ Ratio} = \frac{D}{d} \qquad (1)$$

Conventional RPDS designs usually have a D-to-d ratio of about 3:1. However, recently, a number of unconventional thin housing RPDS have been demonstrated or have been proposed that use very wide-angle lenses and/or curved mirrors to achieve a D-to-d ratio of about 6:1 to 8:1 or more. Two such designs are described in United States Patent Application Publication No. U.S. 20030231261 and United States Patent Application Publication No. U.S. 20040141157, both assigned to Silicon Optix Inc. In the present invention a novel combination of specific optical elements along with electronic correction of residual distortion is used to push the D-to-d ratio to higher levels of about 11:1 while rendering a distortion free image on the screen.

Figure 2:
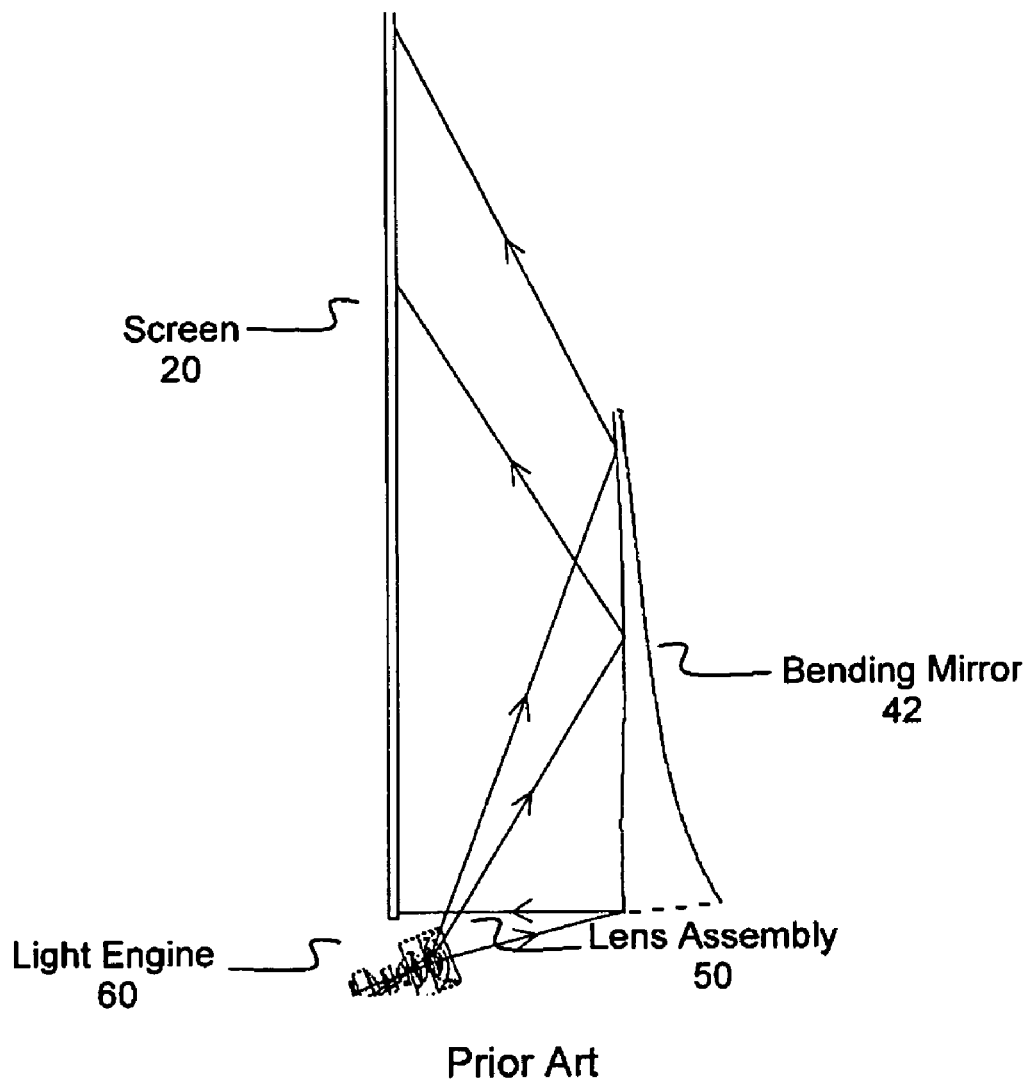
FIG. 2 is a schematic diagram of a prior art off-axis projection with lens offset and flat bending mirror.
Figure 3:
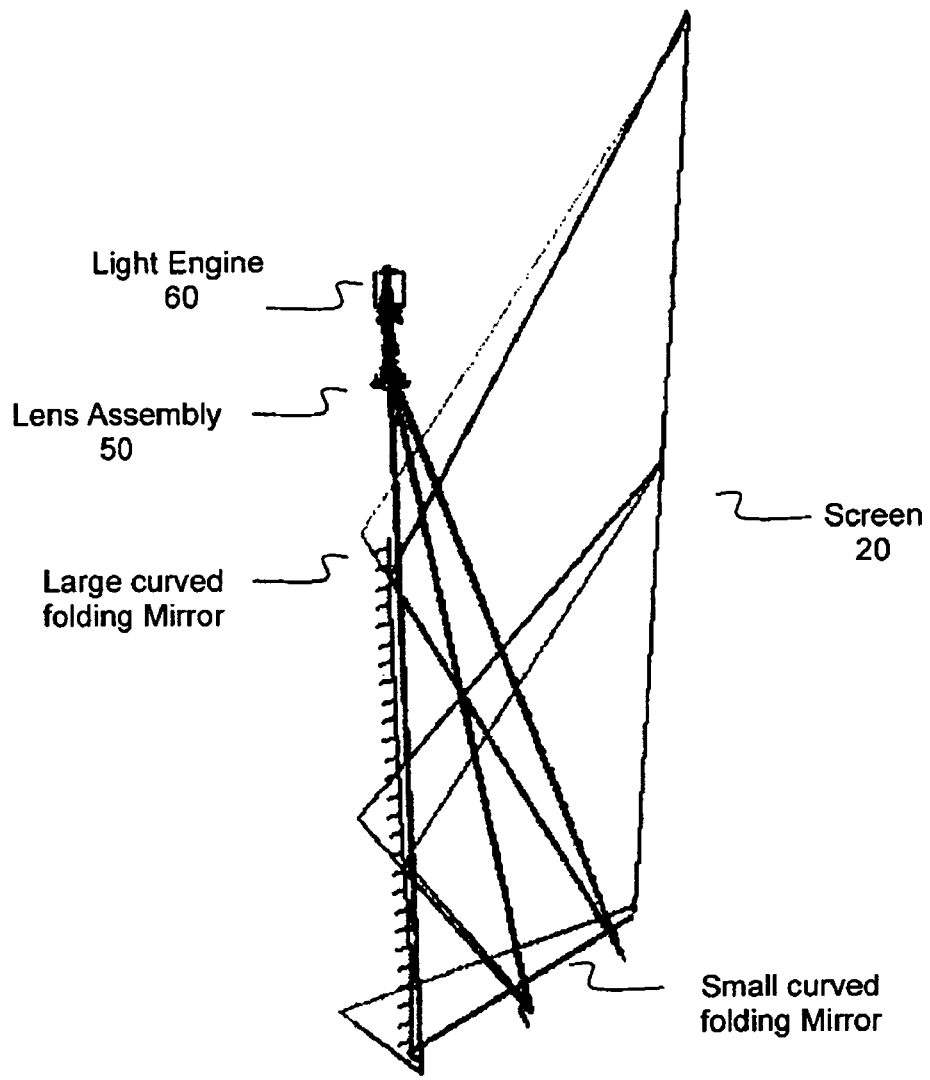
FIG. 3 is a schematic diagram of a prior art off-axis projection with lens offset and 2 curved mirrors.

In RPDS designs, often off-axis projection is used to increase the D-to-d ratio. Off-axis projection, as is well known, causes a type of distortion known as keystone or trapezoidal distortion due to the resemblance of projected rectangles to keystones or trapezoids. In the RPDS design shown in FIG. 2, off-axis projection gives an optical path, which is folded with a flat mirror and an offset between the lens and micro-display is used to correct the resulting keystone distortion. It is possible, as shown in FIG. 3, to use two curved mirrors 42 and 43, to fold the optical path further. Using lens offset to correct for keystone distortion rapidly leads to diminishing returns as the lens diameter and field angle increase, making the lens more expensive.

Figure 4:
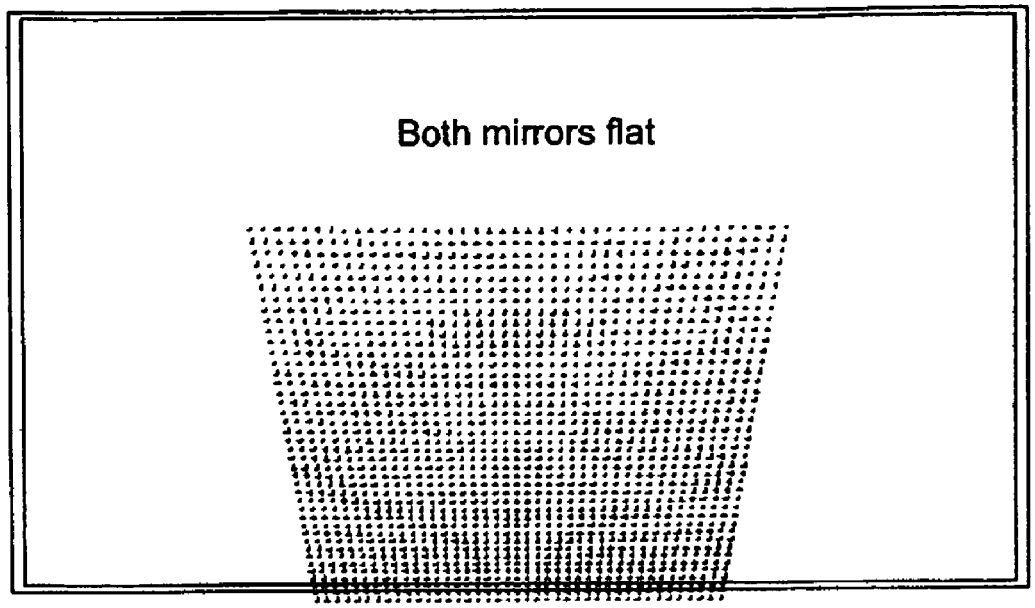
FIG. 4 is graphical representation of the distortion plot with flattening of one or both mirrors in prior art RPDS.
Figure 4:
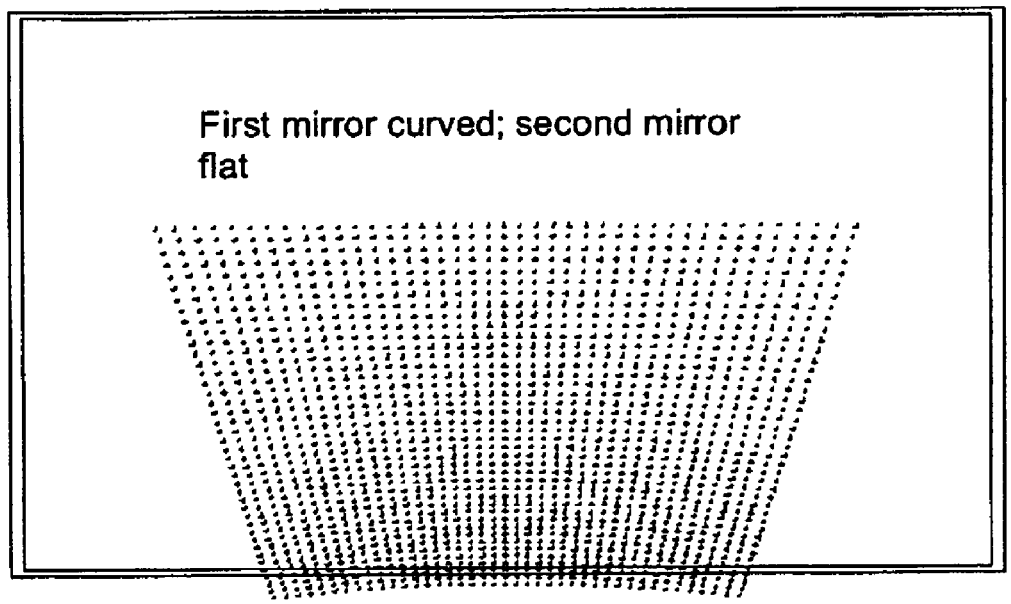
Figure 5:
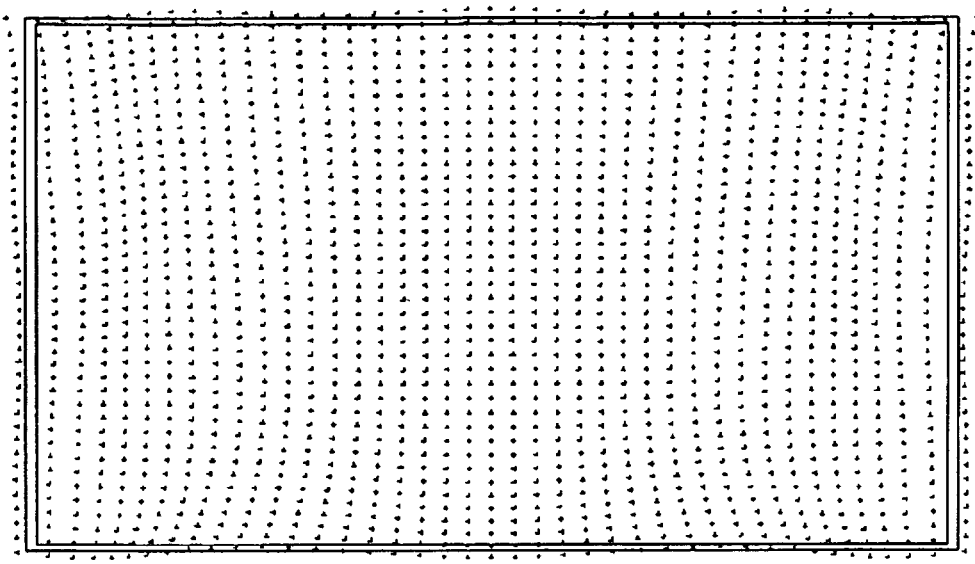
FIG. 5 is graphical representation of a distortion plot with both mirrors properly curved in prior art RPDS.

FIG. 4 is an illustration of projected images for an off-axis RPDS similar to that shown in FIG. 3; the left hand image shows the effect of flattening both mirrors in such a system, resulting in keystone distortion. The right hand image shows the effect of the curvature of only the small mirror; clearly the convexity of the mirror allows the image to cover more of the screen. Clearly, there is residual keystone distortion and portions of the image (the white areas within the screen borders which are not covered by grid dots) are unused (resulting in loss of brightness and loss of the use of peripheral pixels). Finally, in FIG. 5, the large curved mirror is also used to correct some more of the distortion. The curvature is selected such that the bottom of the image is expanded laterally to a greater extent than portions of the image further up. By the use of a specific aspherical curved mirror, a distortion distribution as shown in FIG. 5 can be achieved, restoring the effective resolution of the display and available brightness. Clearly also there is still a residual distortion that makes straight lines into curved lines, but this residual distortion is highly amenable to electronic corrections explained below.

Figure 6:
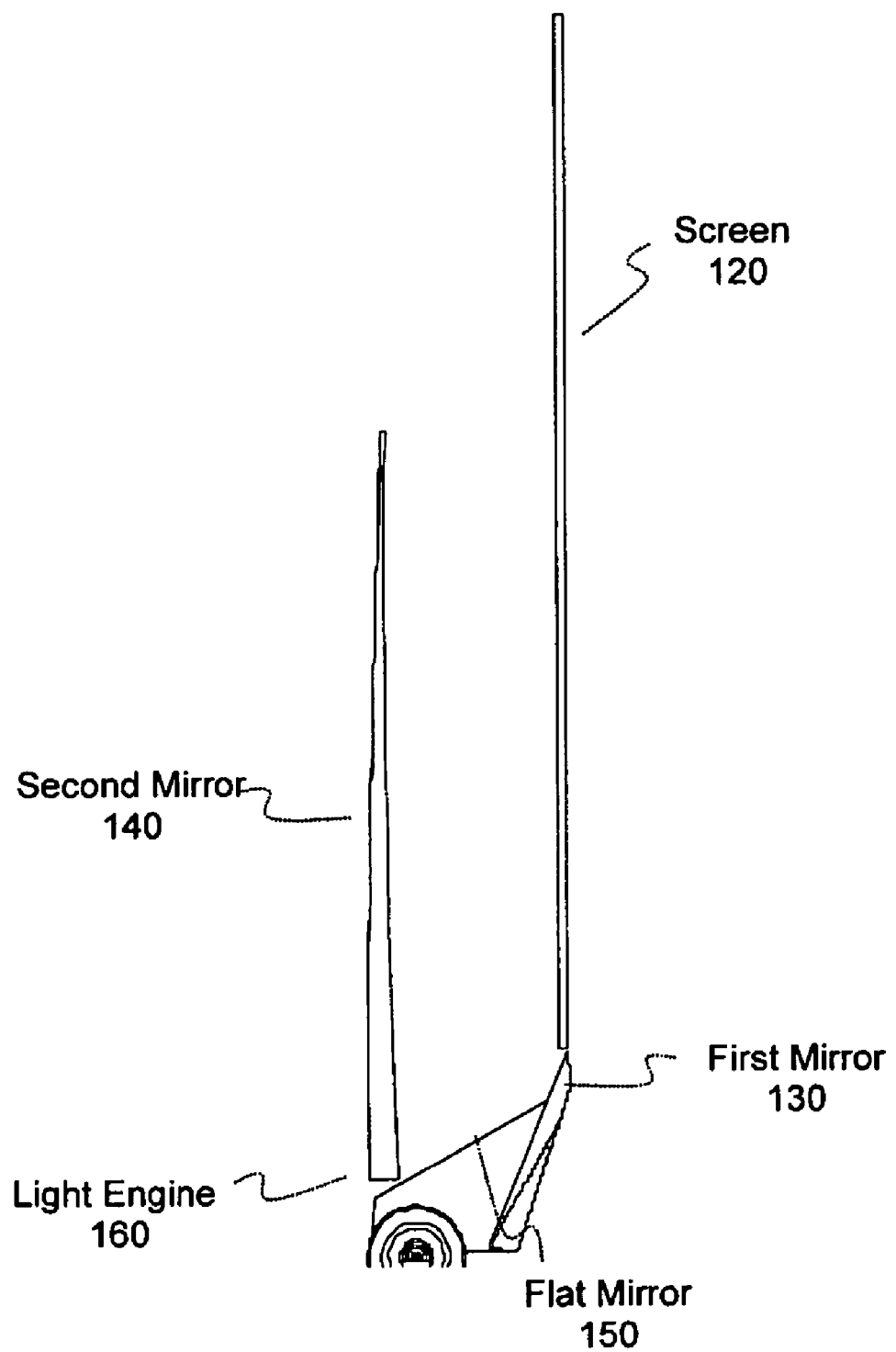
FIG. 6 is the side view of side-firing light engine ultra-thin configuration per present invention.
Figure 7:
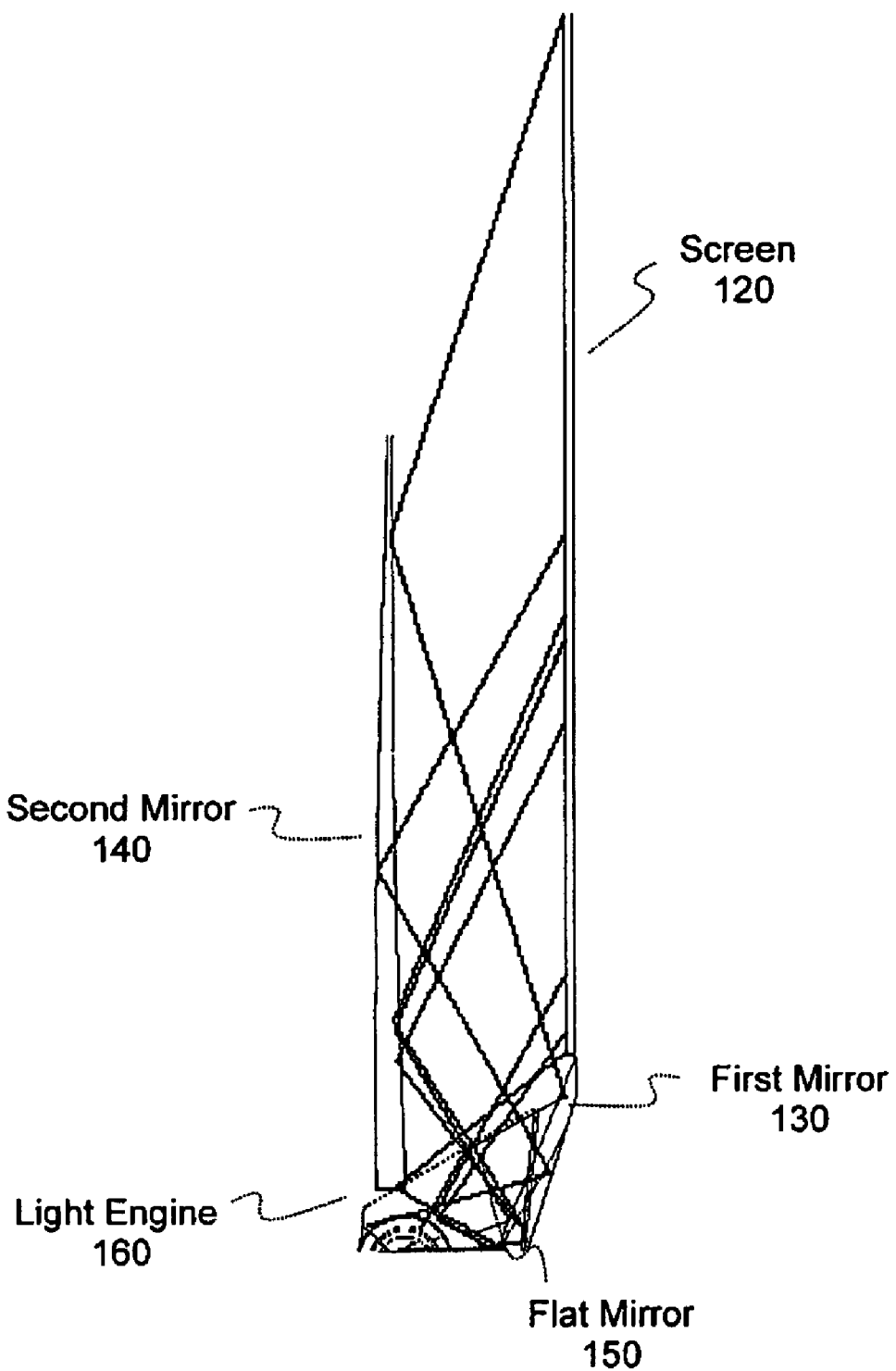
FIG. 7 is the side view of side-firing light engine ultra-thin configuration with rays in accordance with the present invention.

Referring now to FIGS. 6 and 7, there is shown an exemplary embodiment of a novel RPDS 100 according to the present invention. RPDS 100 comprises light engine 160, first mirror 130, flat mirror 150, second mirror 140, and a screen 120. The light engine 160 includes one or more micro-display devices 162 and a lens assembly 164. The structure is held in a housing that is not shown. In the present invention a combination of uniquely sized, shaped and positioned mirrors is used to optimize the D-to-d ratio to approximately 11:1. With such a D-to-d ratio, an RPDS built according to the present invention, has the appearance of a large direct view LCD or plasma display system while being more economical and lighter.

In the exemplary embodiment shown in FIGS. 6 and 7, light engine 160 is generally located at the bottom portion of the housing of the RPDS 100. However, as shown in a top view in FIG. 8, light engine 160 is positioned with its length parallel to the screen length. This is necessary in order to keep the light engine within the housing while keeping the housing thickness low. In this embodiment, flat mirror 150 is used to turn the projected image by 90 degrees. The light engine and projection lens are therefore positioned sideways to keep them within the confines of the thin housing.

In one example of light engine 160, a rectangular shaped beam of light is generated by an illumination subsystem 168 (not shown). The beam of light is then modulated by the micro-display device (or devices) 162. Depending on the technology of the micro-display device 162, the beam of light from the illumination subsystem 168 can be modulated during transmission through, or reflection from the micro-display device 162. Examples of different micro-display device technologies include transmissive designs, such as High Temperature PolySilicon (HTPS) LCD micro-display devices (developed by Seiko-Epson and Sony Corp), or reflective designs, such as MEMS (Micro-Electronic Mechanical Systems) and LCoS (Liquid Crystal on Silicon) micro-display devices. An example of a MEMS device is the DMD (Digital Micro-mirror Display) device developed by Texas Instruments. Examples of LCoS devices are the SXRD devices from Sony Corp. or D-ILA devices from JVC Corp. Single panel or multi-panel micro-display device based light engines can also be used, so in some implementations, light engine 160 can include more than one micro-display device, each of which modulates a different primary color. Micro-display device 162 receives digital input image data from an input interface and uses the data to modulate a rectangular-shaped beam of light in order to produce a final image which is eventually displayed on the screen 120.

Figure 8:
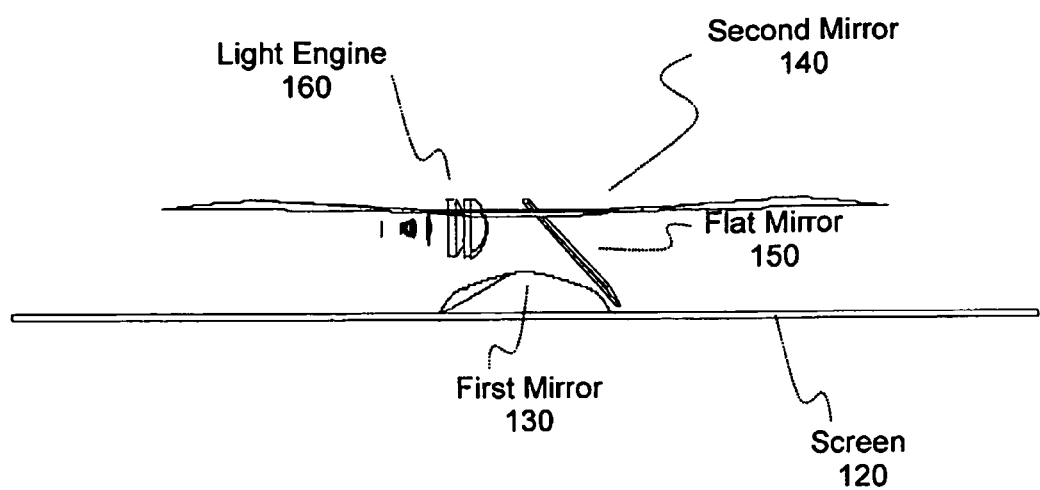
FIG. 8 is the top view of side-firing light engine ultra-thin configuration in accordance with the present invention.

In one example of the invention, shown in FIGS. 6, 7, and 8, light engine 160 is generally positioned at the bottom portion of the housing. In this example, the light engine is positioned parallel to the length of the screen, as shown in FIG. 8, without intruding above the lower edge of screen 120. In this example, the light engine 160 is aligned along the horizontal dimension of the RPDS to keep it within the confines of the housing. A flat mirror 150 is then used to reflect the beam onto first mirror 130.

Figure 9:
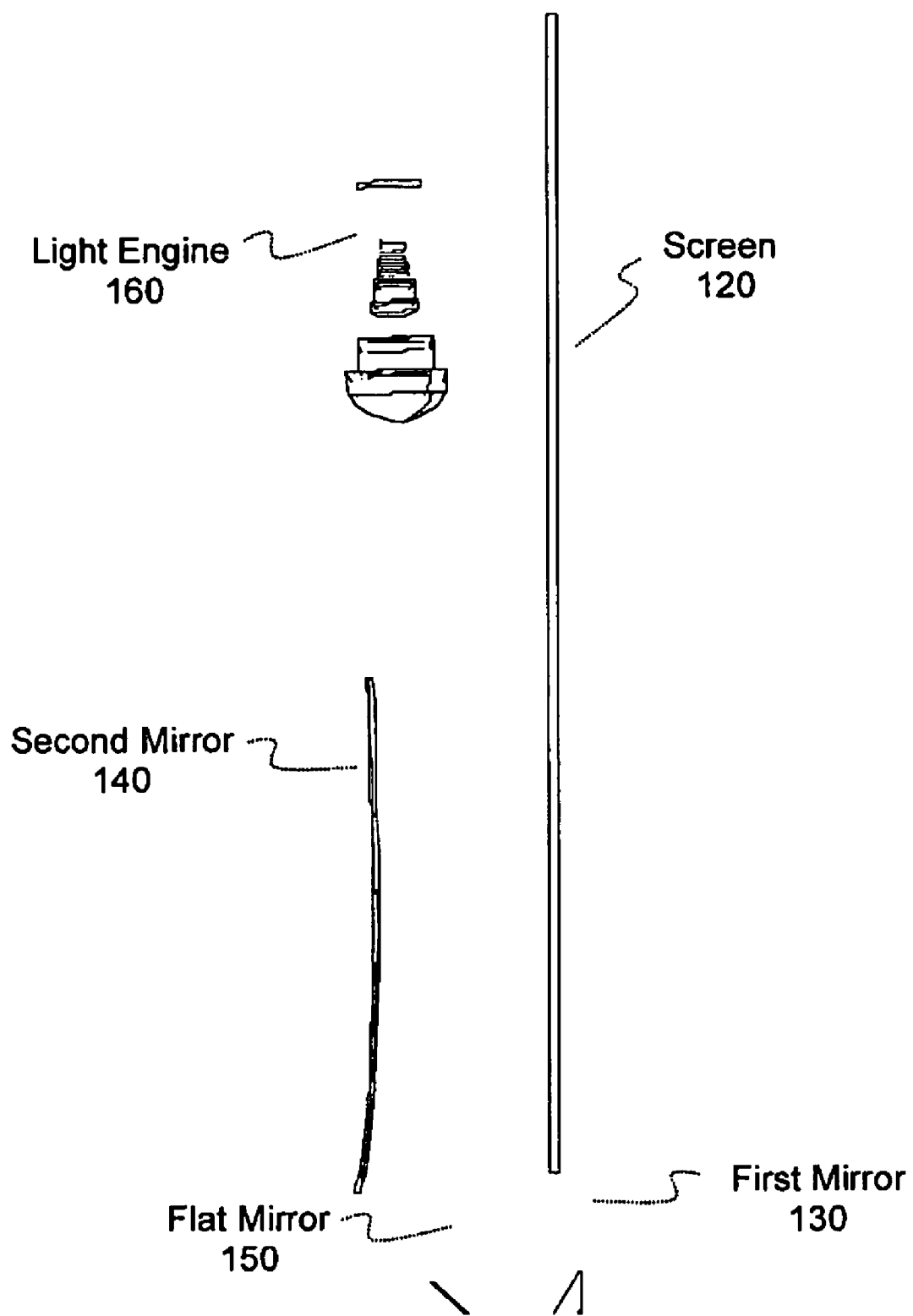
FIG. 9 is the side view of top-firing light engine ultra-thin configuration in accordance with the present invention.
Figure 10:
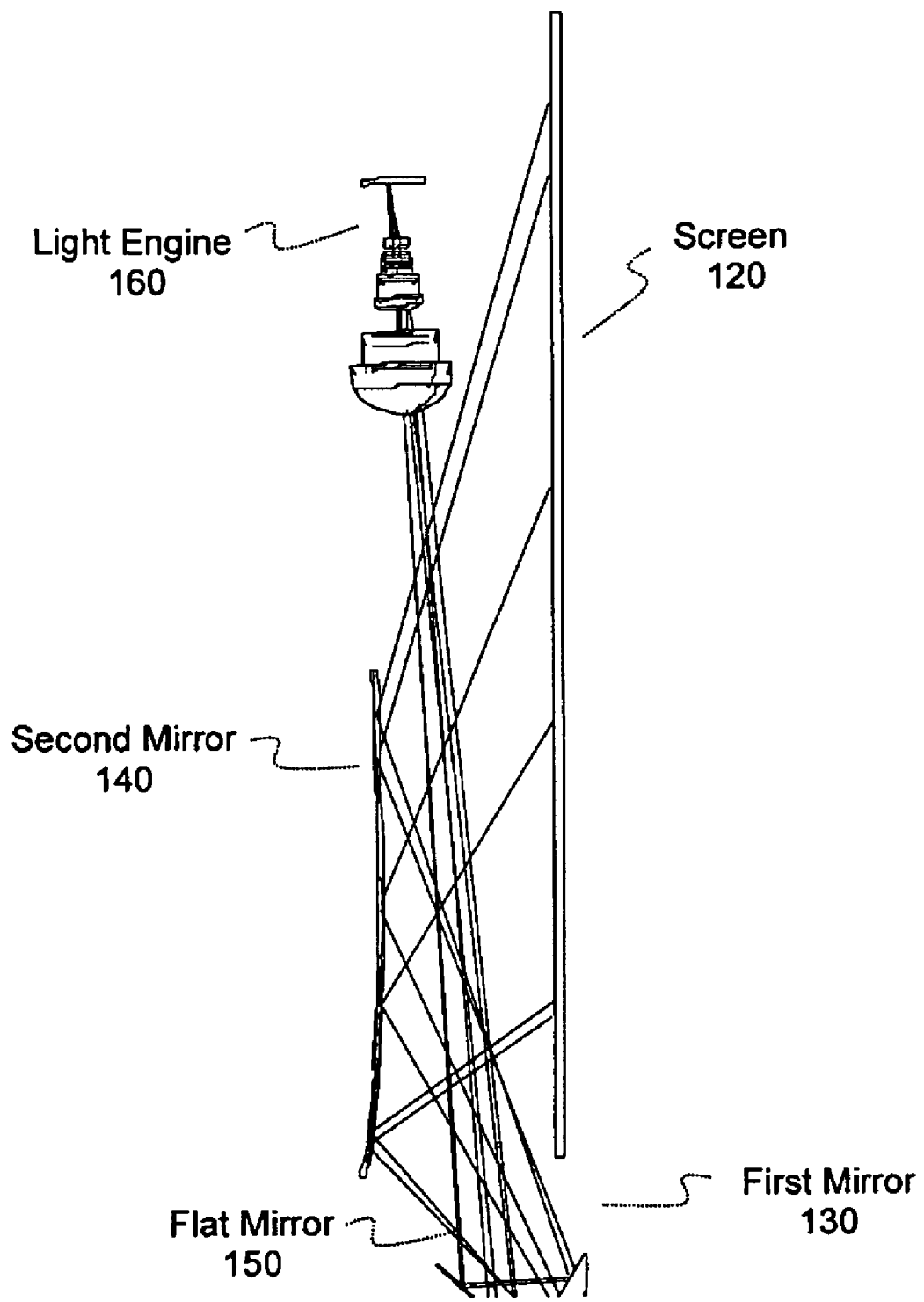
FIG. 10 is the side view of top-firing light engine ultra-thin configuration with rays in accordance with the present invention.

In another example of the invention, shown in FIGS. 9 and 10, light engine 160 is generally positioned at the top portion of the housing. In this example, light engine 160 is positioned without protruding above screen 120. The position of light engine 160 at the top of the housing facilitates convective heat dissipation without affecting other components. In this configuration, there are fewer problems caused by heat rising from the light engine through the RPDS system. This heat, if not properly managed or dissipated, can cause temperature rises which may deform various optical elements in the system and cause image distortion, focus problems and other visible artifacts in the image. Flat mirror 150, in this example, is used to reflect the beam, redirecting the image onto first mirror 130 as shown in the figure.

The image is projected by lens assembly 164 which is positioned right after micro-display device 162. As a result of the design of the present invention, lens assembly 164 does not need to be complex. A smaller number of lens elements may be used. The magnification of the image is achieved via the long light path and the reduced field angle of this configuration inherently reduces aberrations including distortion and lateral color shifts.

The surface profile and positioning of first mirror 130 and second mirror 140 along with the prescription of the lens assembly are crucial in the design of the present invention. Different lens designs and mirror profiles can yield different system goals. For example, the lens could be comprised of mostly or all-spherical lens elements, for lowered cost and shorter lens assembly times. This would however entail more complex curved mirror profiles. Mirror profile curvatures can be distributed between the two mirrors in different ways for different needs.

The ultra-thin RPDS design of the present invention benefits greatly from having a light engine that is compact in order to fit within the confines of the housing without any special optical, mechanical, or other measures taken to ensure that they do fit. There are two subassemblies in light engine 160 that can cause difficulties in making it fit easily: the illumination subsystem 168, and the projection lens assembly 164. Traditional illumination subsystems consist of either high intensity discharge (HID) ultra high pressure (UHP) mercury lamps (which typically have low spectral emissivity in the red wavelengths, and peaky emissivity everywhere else) or broad emission spectrum lamps such as xenon and microwave plasma lamps. In all these cases, the light is created by a plasma fireball. There are constraints imposed on bulb orientation to ensure adequate heat dissipation, mitigate electrode erosion, and allow reasonable lamp lifetime. These constraints, along with other design factors including cooling fan, heat sinks, etc. can limit how compact such a subassembly can be made.

A projection lens assembly consists of multiple elements and its dimensions are dictated by the size of the light modulator (typically 0.5" to 1.5" in diagonal), the amount of offset (100% offset doubles the lens entrance pupil diameter), the amount of magnification required (the larger the screen and/or the smaller the micro-display, the longer and more expensive the lens assembly becomes), and whether the lens assembly is folded or not. A folded lens assembly includes an additional front surface mirror (FSM) allowing the lens to fit in a smaller space. The light path may be folded or rotated depending on how the lens assembly needs to be fitted within the cabinet. Folding may involve a vertical inversion of the image. Rotation involves exchanging the rows/columns of the image data.

In the present invention, RPDS 100 achieves a D-to-d ratio of about 11:1. For a commercially acceptable RPDS having screen diagonals from around 40 inches to over 80 inches, the exemplary embodiment housing depths are from 4 to 8 inches. This imposes a severe constraint on the mechanical dimensions of illumination subsystem 168 and lens assembly 164. Since the lens assembly itself is likely to need multiple lens elements, most of the housing depth space available is already occupied. Accordingly, in the example shown in FIG. 8, light engine 160 needs to be positioned sideways within and along the length of the housing. The light engine then projects through a turning flat mirror 150 whose sole purpose is to reposition the light engine sideways within the cabinet. In this exemplary embodiment, light engine 160 can be longer, however, obviously it still cannot be wider than 4 to 8 inches.

In order to keep light engine 160 within the thin housing, in one example of the present invention, the illumination subsystem 168 is provided by three (or more) solid state red, green, and blue LEDs. In another example of the invention, built along the same guidelines, the illumination subsystem 168 is provided by three (or more) solid state red, green, and blue lasers. It should be noted that any kind of lasers or LEDs providing a combination of any set of primary colors could be used without departing from the scope of the present invention. LED and laser light sources can be switched very rapidly and can therefore eliminate the need for a color wheel in field-sequential light modulation schemes. Both types of light source have low power requirements and can improve color gamut. LEDs may have to be screened for desirable wavelengths (that lie close to the CIE spectrum locus curve).

Lasers are inherently monochromatic, and thus lie on the CIE spectrum locus. With properly chosen wavelengths, they can provide a greatly increased color gamut and their wavelength, being determined by material properties, does not drift. Lasers generate polarized light, an advantage in multi-panel LCD or LCoS systems as these require polarized light anyway, so there is a further opportunity for component reduction. Lasers are suitable for RPDSs (as opposed to front projection devices) because the enclosure protects the user against potential eye and/or skin damage. Lasers have an etendue advantage over all other light sources because the emitting region can be considered almost a true point source. This allows lenses with relatively high f# to efficiently collect the light from a laser emitter, resulting in some optics cost savings. LED emitters are not quite that small and, like UHP lamp fireball dimensions, limit the etendue of the system.

If an RPDS system uses a color wheel for field-sequential operation, ⅔ of the light is discarded. In practice, even more of the light may be unusable because of a poor spectral distribution of the light source. This is particularly true in UHP lamps, which are severely deficient in red, but have energy in green, blue, and yellow.

DLP micro-displays modulate light by mechanically reflecting the light from every pixel through a lens or into a dump zone (for wasted light) according to whether the pixel is on or off. The shade is determined by changing the proportion of time duration that the pixel is on or off. LCD and LCoS based RPDSs need polarized light because the light modulation works by rotating the polarized light through a further 90 degrees or not. Analyzers allow this light to continue into the lens or stop it, or the light either passes through or is reflected from a surface with dichroic coatings.

Figure 11:
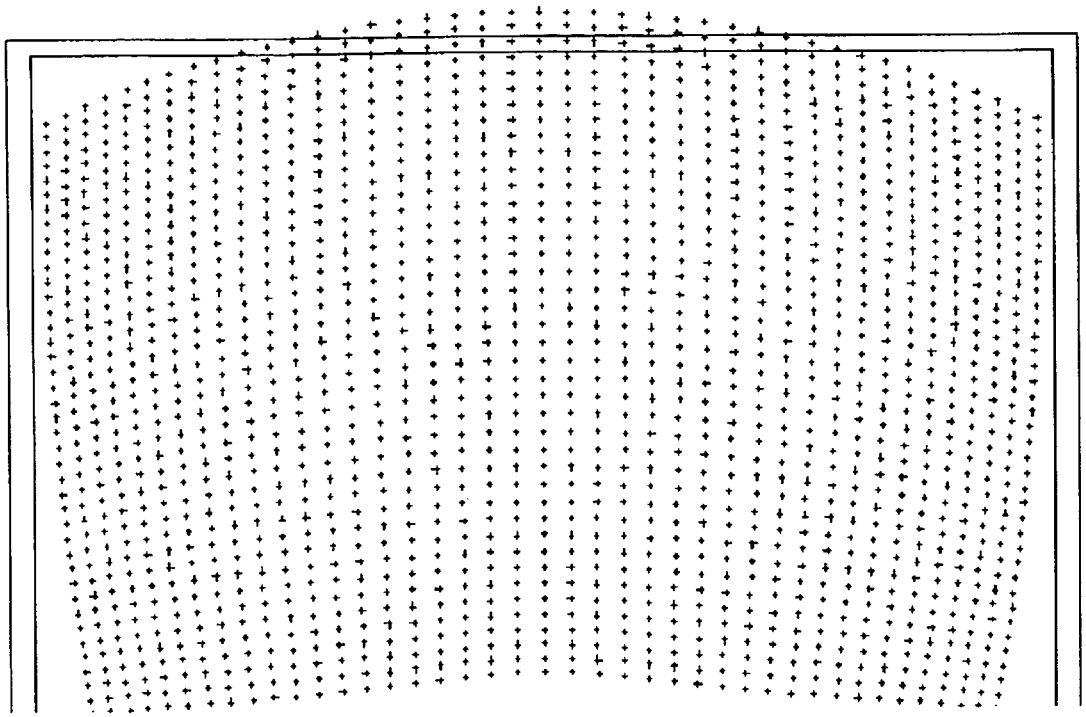
FIG. 11 is graphical representation of the distortion plot after flattening one mirror in an ultra-thin configuration in accordance with the present invention.
Figure 12:
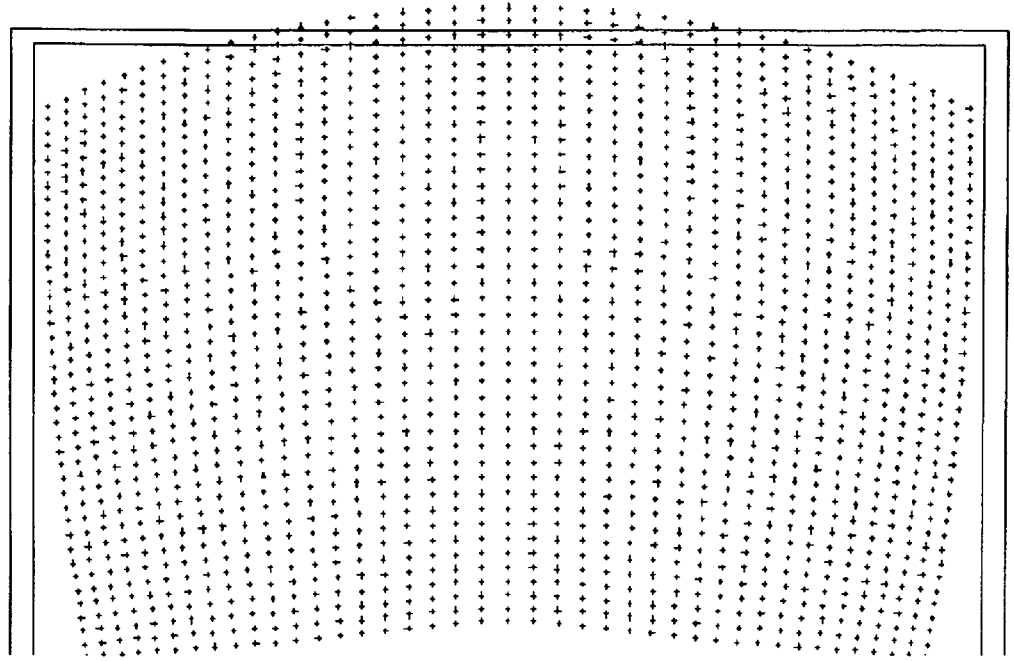
FIG. 12 is graphical representation of the distortion plot with both mirrors properly curved in an ultra-thin configuration in accordance with the present invention.

Referring now to FIGS. 7 and 10, once the modulated image is produced, the image is projected by the lens assembly 164, which is positioned right after the micro-display device 162, onto the flat mirror 150 and then onto first mirror 130. First mirror 130 is used in combination with second mirror 140 and lens assembly 164 to correct for the geometric distortions of the final image that is to be displayed on the screen 120. To understand the effect of the importance of the proper shape, profile, and size of the two mirrors reference is made to FIGS. 4 and 11. If both first mirror 130 and second mirror 140 were flat, the resulting image would look very similar to that shown in FIG. 4. Meanwhile, FIG. 11 is an illustration of a projected image that is produced if only second mirror 140 was flat and only first mirror 130 was properly shaped. In accordance with the present invention, FIG. 12 is an illustration of a projected image that is produced by the off-axis RPDS 100 of the present invention on the screen 120 if both mirrors 130 and 140 are curved with specific sizes and profiles chosen to be similar to those shown in FIGS. 13 and 14 respectively.

Figure 13:
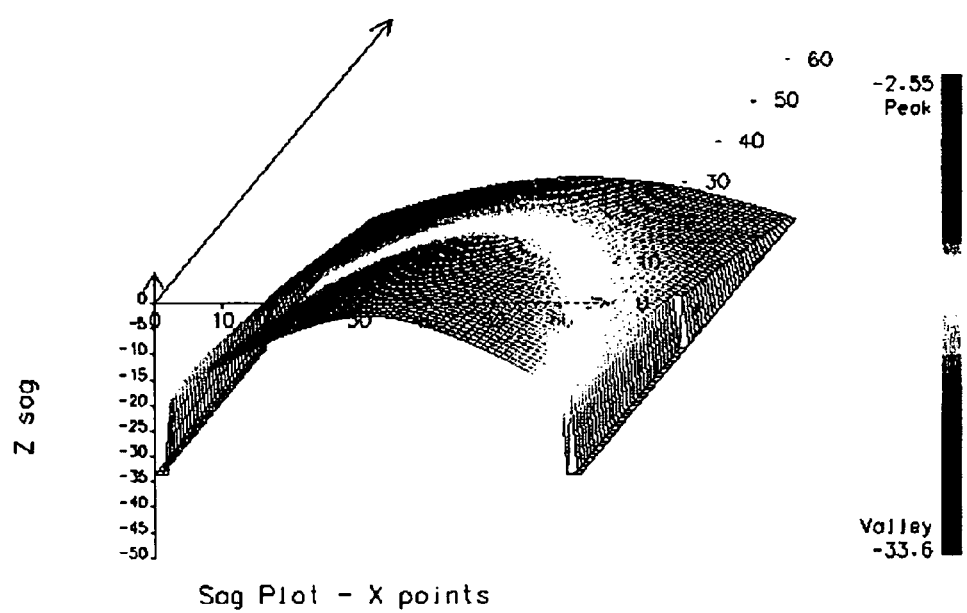
FIG. 13 is graphical representation of the surface profile of a first curved mirror in accordance with the present invention.

FIG. 13 is an illustration of the profile of first mirror 130 built according to one example of the invention. First mirror 130 is significantly smaller than the screen 120. First mirror 130 has dimensions significantly smaller than screen 120. It has a horizontally convex curvature in order to expand the image along the length of screen 120. The horizontal curvature of first mirror 130 is such that in its lower portion, which reflects the lower part of the image, it is more convex and less concave than the upper portion. This is for partial correction of the off-axis keystone effect. Meanwhile, first mirror 130 has a vertical curvature which is a function of the focal length of the lens assembly 164. For shorter focal length systems, first mirror 130 is more concave and less convex, and for longer focal length designs, it is less concave and more convex.

Figure 14:
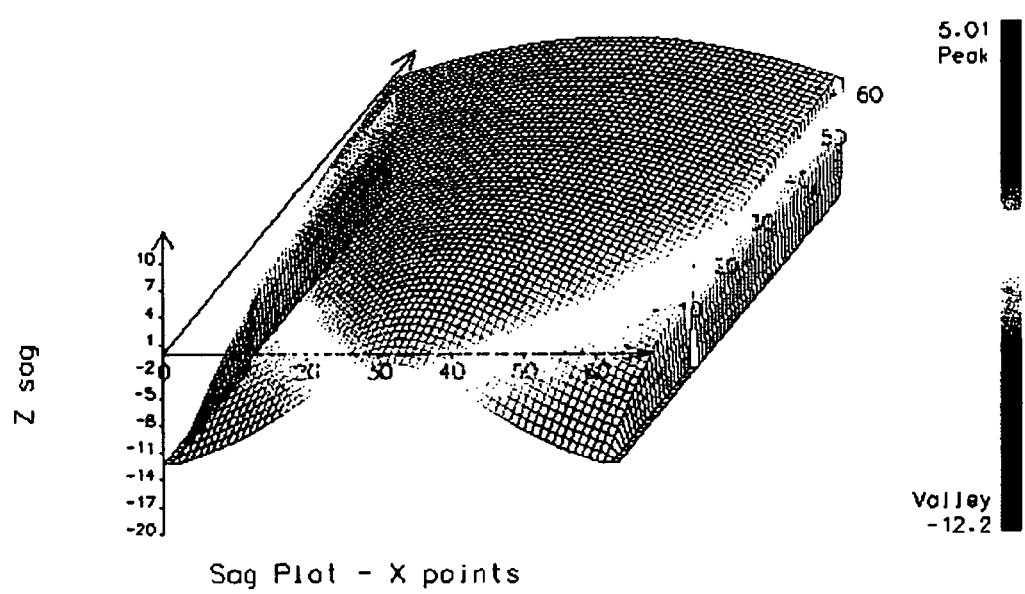
FIG. 14 is graphical representation of the surface profile of second curved mirror in accordance with the present invention.

FIG. 14 is an illustration of the profile of second mirror 140 which is significantly larger than first mirror 130 but smaller than the size of screen 120. As seen in FIG. 12. Keystone distortion similar to that shown in FIG. 4 is largely corrected, and the image is sized to fit the screen 120 exactly with minimal visual distortion. This residual distortion is corrected with electronics as explained below. The importance of matching the projected image to the size of the screen is to avoid losing pixel resolution (by turning off unused pixels) and brightness (turning off the unused pixels results in less light throughput).

FIG. 14 is an illustration of an example for the surface curvature or profile of the second mirror 140. It is a non-rotationally symmetric mirror having dimensions significantly larger than first mirror 130 and smaller than screen 120. The function of second mirror 140 is, in addition to adjusting the vertical size of the image, to expand the vertical spacing of pixels on the bottom portion of the image relative to the top portion of the image. Accordingly, the vertical profile is shaped such that second mirror 140 has a vertical curvature that changes from less convex (or more concave) on the top portion, gradually changing to more convex (or less concave) toward the bottom portion. The amount of the curvature depends on the size of the image on the screen in the absence of second mirror 140 which, in turn, depends on the lens assembly focal length and the shape of first mirror 130. If the image needs vertical magnification to fill the screen at the top, then second mirror 140 needs to be vertically convex throughout. However, if in the absence of second mirror 140, the image vertically fills the screen or is larger, then second mirror 140 is concave at the top portion and convex at the lower portion Considering the horizontal curvature profile, second mirror 140 has a horizontally convex curvature on its upper surface that smoothly increases its degree of convex curvature towards its lower surface; in other words, it has a large horizontal radius of (convex) curvature on its upper portion and progressively smaller horizontal radii of curvature towards its lower portion. This profile has been designed to correct for the distortions created by projection geometry, most of which result from the off-axis nature of the RPDS 100.

Considering FIG. 4, the projected images that result when one or both mirrors are flat, clearly show the need for horizontal expansion (less at the top, and more on the bottom) in order to cover the whole horizontal width of the screen 120. Accordingly, second mirror 140 is designed to have a slightly horizontally convex upper portion to slightly expand the image to fit across the entire width of the upper portion of the screen 120. Second mirror 140 is also designed to have a much more convex lower portion to expand the image to horizontally fit the width at the lower portion of the screen 120. As seen in FIG. 14, the transition between the top of second mirror 140 and the bottom of this mirror is smooth and gradual, corresponding to the keystone shape of the uncorrected image.

In the vertical direction, as seen from FIG. 4, there is an expansion of line spacing at the top of the screen compared to the bottom of the screen. This is also a consequence of off-axis keystone distortion. To correct for this, as seen in FIG. 14, second mirror 140 is designed to have a slight vertical concave curvature to slightly shrink the image in the vertical direction to equalize the line spacing in the image between the top and bottom. Unlike the horizontal expansion of the image which is dramatically different for the upper and lower portions of the image, the vertical shrinking of the image is symmetric. The second mirror 140 therefore, in this exemplary implementation, has an axis of symmetry extending from an upper middle portion to a lower middle portion. It is clear that in this exemplary implementation, second mirror 140 is not spherically or even rotationally symmetric.

In one example of the RPDS 100, the vertical position of the light engine 160 is adjusted such that the keystone effect from the off-axis projection gives rise to an upper portion of the final image with exactly the same width as the upper portion of the screen 120. In these exemplary implementations, the upper portion of the second mirror 140 is nearly flat which reduces the complexity of the design and manufacture of the second mirror 140.

Figure 15:
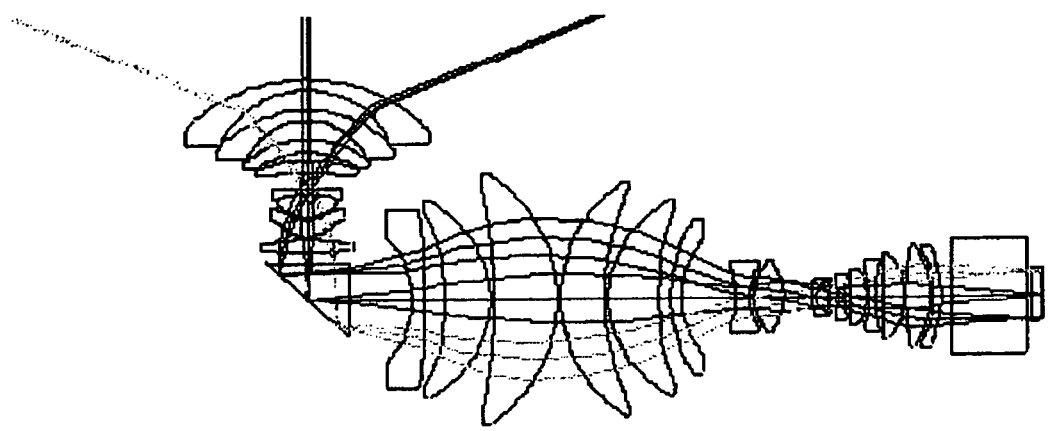
FIG. 15 is side view of an exemplary super wide-angle lens used in prior art thin-chassis RPTV.

Some prior art ultra-thin RPDS designs use a very wide-angle lens and a lens offset to make the housing thinner. An example of the full field in such an example is shown in FIG. 15 (no offset shown). The micro-display panel is smaller than the field shown and offset to one side in actual use. These lens assemblies could have 20-30 optical elements and are very expensive. In the vast majority of RPDS systems, a Fresnel lens is used to collimate light rays arriving from the projection system so that the rays strike the back of the screen at almost normal incidence angles. Conventional RPDS designs use symmetrical Fresnel lenses which deal with only a small variation of incidence angles, all of which are symmetrical about the center of the screen. Thin-chassis RPDS designs, however, must use Fresnel lenses with more or less highly offset centers in order to deal with a larger variation of incidence angles, and particularly a highly unsymmetrical distribution of these angles from the top of the screen to the bottom.

The incidence angles (referred to as Fresnel angles) of the light rays impinging on the Fresnel lens with respect to the horizontal can vary from 5° to 10° minimum to 70°+ maximum. One solution to the problem of collimation of light in such conditions uses a very special Fresnel lens which is refractive up to around 30°, then reflective using total internal reflection (TIR) from there, up to the maximum angle. TIR Fresnel lenses typically work from around 30° to around 80°.

Figure 16:
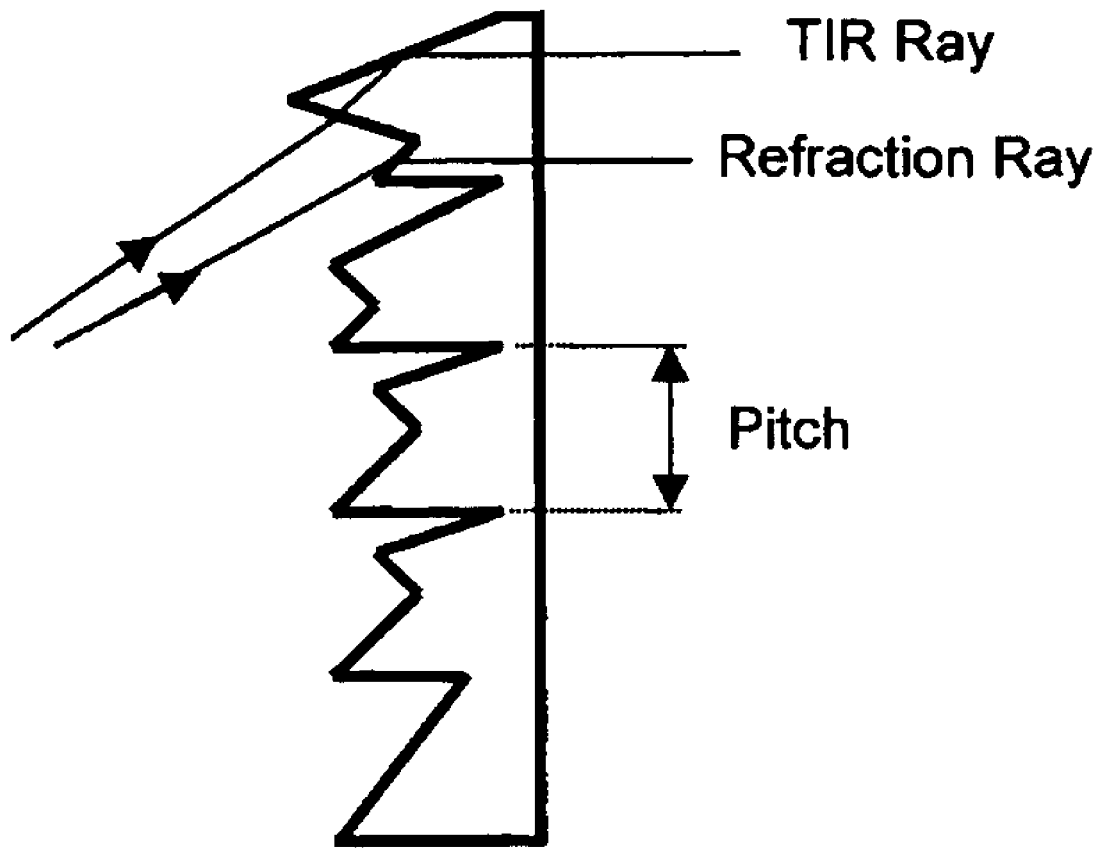
FIG. 16 is schematic diagram of an example of a hybrid Fresnel lens used in prior art.

This so-called "hybrid" Fresnel is quite expensive to manufacture as besides the complex Fresnel surfaces, it also required a rigid optically-perfect mounting surface, because of the sensitivity of its performance to slight flexing. FIG. 16 is an illustration of the shape of the transition region of an example of such prior art hybrid reflective and refractive Fresnel lens.

As can be seen from FIG. 16, there are different blades for total internal reflection (TIR) and refraction of light in each pitch and consecutive pitches of the lens do not follow a specific pattern. The transition is gradual over the entire extent of the Fresnel lens. Small deflections of the Fresnel surfaces could cause very large shifts in the active area for any specific light beam impinging on the lens. These deflections can be caused by absorption of moisture or by a non-rigid Fresnel lens and screen assembly. These shifts can result in ghost images and brightness variation.

To prevent this, one has to use an optically-perfect and rigid transparent sheet, both sides of which are parallel to within optical tolerances, and to which the Fresnel lens is attached. The attachment is done by using an expensive optical-grade adhesive that is transparent and has optical and thermal properties matching that of the transparent sheet and the Fresnel lens. This adhesive is very expensive and so is the rigid transparent sheet.

Another prior art approach uses a dual Fresnel which has two grooved surfaces, on opposite sides. This structure needs to be very rigid in order to prevent artifacts due to flexing of the lens. One way to achieve this is to place a rigid transparent sheet in the center and attach the two Fresnel lens components on the two sides. The attachment is again done by using an expensive optical-grade adhesive that is transparent and has optical and thermal properties matching that of the glass and the two Fresnel lens. This prior art structure is again expensive and needs sensitive alignment.

TIR Fresnel lenses, however, are made from plastic polymers, fabricated in a UV-sensitive process, and can be made at very similar cost to conventional refractive Fresnel lenses. Both linear and circular TIR Fresnel lenses have been developed commercially. The exemplary design of the present RPDS 100 is compatible with the use of a circular TIR Fresnel lens.

Figure 17:
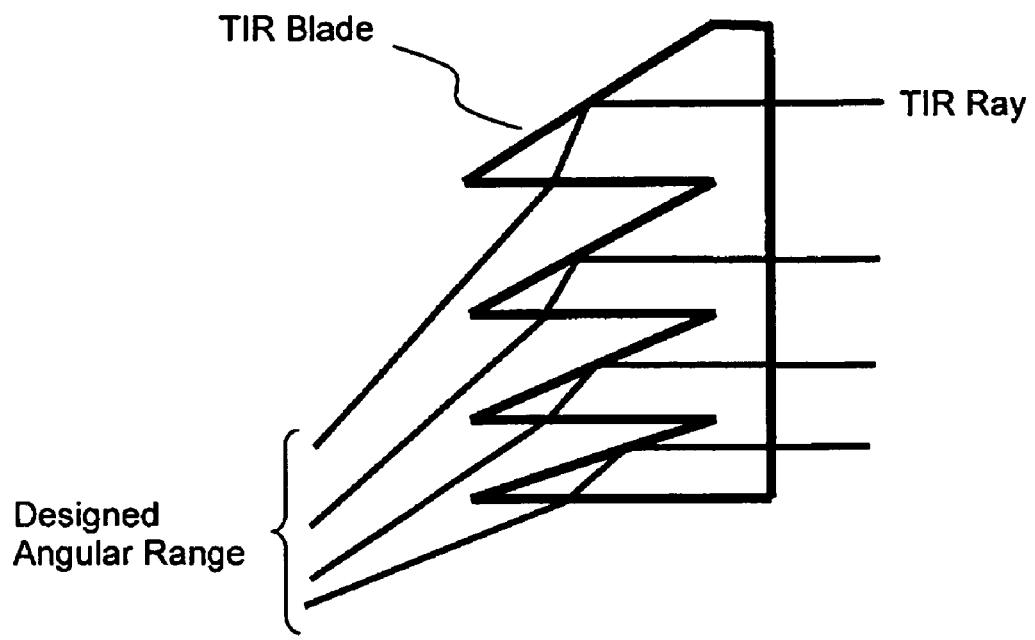
FIG. 17 is schematic diagram of an example of a circular TIR Fresnel lens used in one example of the present invention.

FIG. 17 is an illustration of an example circular TIR Fresnel lens 110 used in the RPDS 100 of the present invention. The structure of this type of TIR Fresnel lens is much simpler than the hybrid reflective and refractive Fresnel lens shown in FIG. 16. As seen in FIG. 17 the rays of light impinge on the blades of the TIR Fresnel lens 110 within an angular range of 25 to 30 degrees. The structure of the Fresnel lens 110 in this example has a gradation wherein each inclined TIR blade is steeper on the upper portions, corresponding to a higher angle of the incoming rays with respect to the screen normal.

At each blade, an incoming ray of light arrives at the horizontal air-Fresnel interface, where it undergoes refraction toward the direction of the interface normal. The refracted ray then undergoes a total internal reflection at the air-Fresnel interface of the inclined blade and exits the Fresnel lens close to horizontal. Accordingly, the gradually increasing inclination of the angles of the consecutive inclined blades causes each ray to be very close to the interface normal when it exits the Fresnel lens, resulting in a collimated beam. As a result, the ray does not suffer a change of direction through further refraction. This is very important in the design of RPDS 100 since any stray refraction of an exiting ray would further divert that ray away from the interface normal causing so-called "ghost" images.

Figure 18:
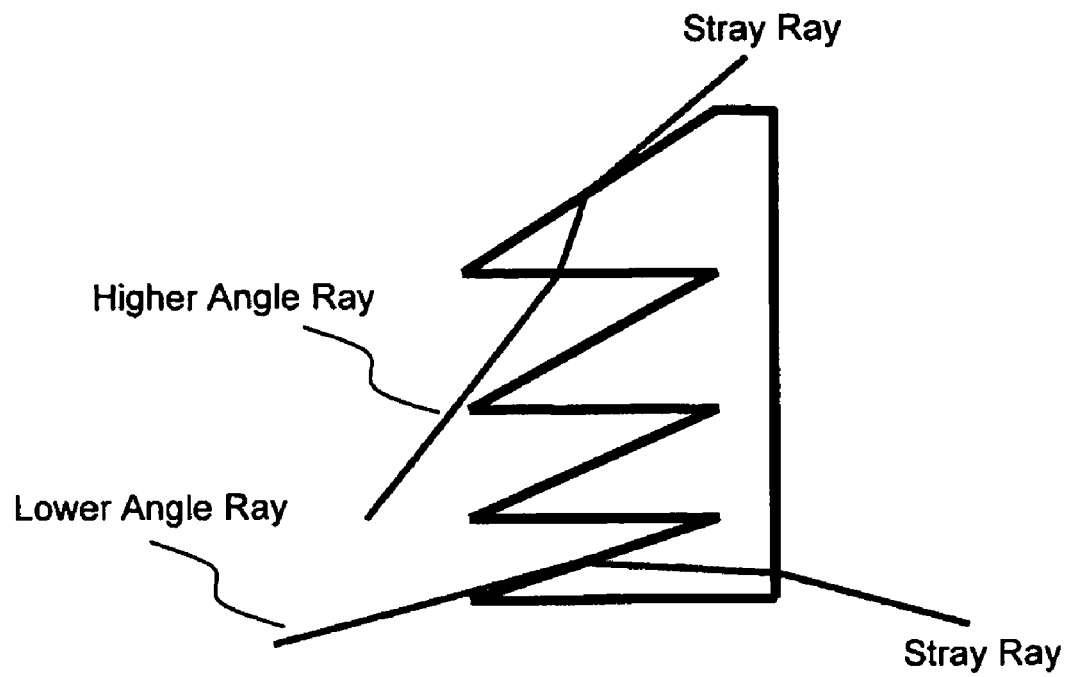
FIG. 18 is schematic diagram of an example of stray ray generation in a circular TIR Fresnel lens.
Figure 19:
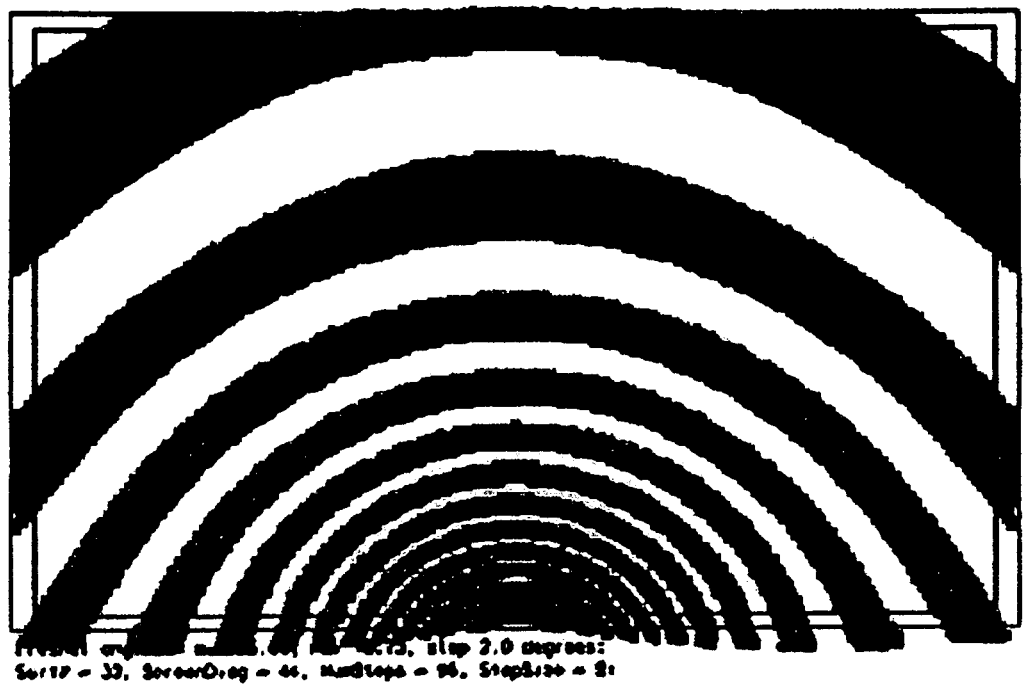
FIG. 19 is graphical representation of the range of incidence angles on a screen in one example of the present invention.

One crucial importance of the design of the RPDS of the present invention is realized in FIG. 18. As seen from the figure, the lowest ray arrives at Fresnel lens 10 at the lowest angle with respect to the screen normal. It can be seen from FIG. 18 that if the angle of the incoming ray is slightly lower than that of the lowest depicted ray in FIG. 17, it would become parallel to or would have a lower angle than the corresponding inclined blade with respect to the screen normal. Such a ray would then undergo refraction on the inclined blade and would go astray as shown in FIG. 18. On the other hand, if the incoming ray angle is slightly higher than that shown for the highest ray of top of FIG. 17, it would refract from the horizontal blade, but it would no longer go through total internal reflection at the inclined blade. The angle of the ray direction with respect to the interface normal of the inclined blade would be too small to produce a total internal reflection. Instead, it would refract, exiting that blade with a slight angle with respect to the interface tangent as shown at the top of FIG. 18.

Figure 20:
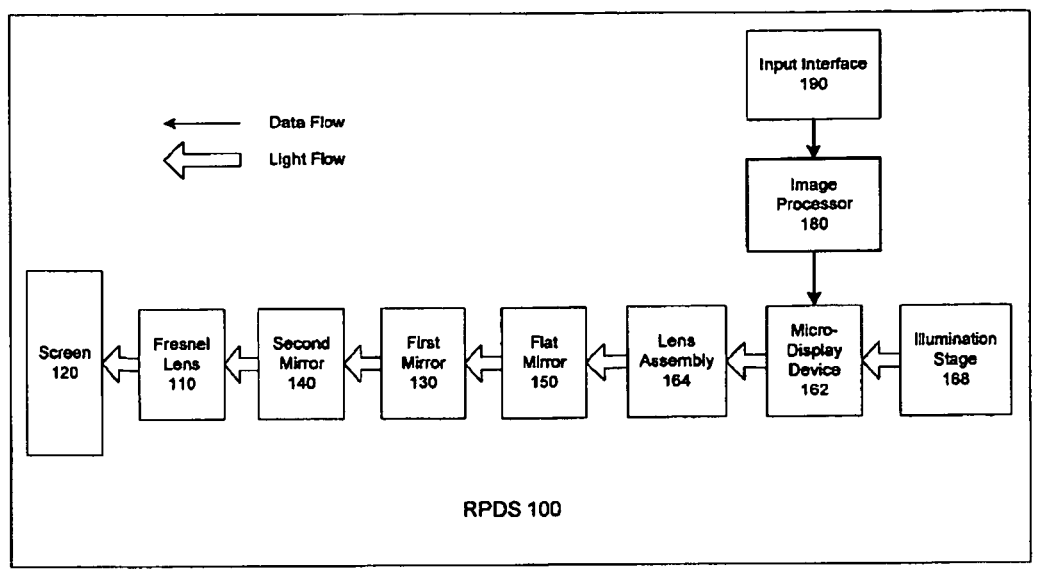
FIG. 20 is a block diagram of an exemplary RPDS.

Referring now to FIG. 20, a block diagram of an exemplary implementation of the RPDS 100 is shown in which image processor 180 is used to correct for geometric and optical distortions of the displayed final images. Digital input image data is first received by the image processor 180 via an input interface 190. Even though the first and second mirrors 130 and 140 can correct for most of the distortion caused by off axis projection, there is still some residual distortion, which can be corrected by the image processor 180.

Image processor 180 is coupled with the micro-display device 162 and the input interface 190. Image processor 180 drives the micro-display device 162 via an interface chip (not shown). Image processor 180 receives digital input image data and distortion parameters from the input interface 190. The distortion parameters characterize all optical and geometric distortions of the system 100. Based on the distortion parameters, image processor 180 generates a transformation from the input image pixel space to the output image pixel space, which pre-compensates for the geometric and optical distortions of the system 100. Image processor 180 then applies the transformation to the digital input image data to produce pre-compensated input image data. Micro-display device 162 then produces an image by modulating a light beam, provided by illumination stage 168, according to the pre-compensated input image data. When an image is projected through the lens assembly 164, off the flat mirror 150, first and second mirrors 130 and 140, the pre-compensation provided by the transformation eliminates the residual optical distortions due to these optical elements and the residual geometric distortions due to off-axis projection.

One way to illustrate the function of image processor 180 is to denote the effect of the whole distortion, represented by the distortion parameters, as a distortion transformation function F. The pre-compensation transformation of the image processor 180 is then given by the inverse transformation function $F^{-1}$. The following relation in equation (2) then demonstrates the overall result due to the pre-compensation performed by image processor 180.

$$\text{Displayed Image}=F(F^{-1}(\text{Input Image}))=\text{Input Image} \quad (2)$$

The input image data is basically a 2D array of pixels. Image processor 180 re-samples each pixel in the input image data and pre-compensates for the optical and geometrical distortions by applying the transformation function $F^{-1}$. An exemplary implementation of the transformation function $F^{-1}$ includes the use of surface functions parameterized in terms of the distortion parameters.

The geometric distortions are mostly caused by the off-axis projection which causes a keystone effect. FIGS. 4 and 11 provide illustrations of exemplary uncorrected or partially corrected keystone distorted images caused by off-axis projection. Appropriate surface profiles, as previously discussed, can be chosen for the first and second mirrors 130 and 140 to correct for the bulk of the keystone distortion. However, the image processor 180 is also used to pre-compensate for any residual distortion.

Some optical distortions are primarily due to deviations from paraxial lens theory which gives rise to pincushion/barrel distortion. Other aberrations can arise from mirror surface curvature (deliberate or otherwise), wavelength dependencies of optical parameters, etc. These aberrations are functions of the optical path length of the light going though different portions of the optical elements. The intensity of light in the displayed final image falling on a point or section of the screen varies, especially falling off in brightness at the corners of the screen. This leads to brightness variations or luminance non-uniformity within the displayed final image. In an off-axis projection system, there are more pronounced differences in the path length traversed by light rays impinging at the upper portion of the screen versus the lower portion of the screen. Consequently, the brightness variations are greater for an off-axis projection system than for an on-axis projection system. To achieve proper brightness distribution on the screen, the image processor 180 adjusts the brightness of each pixel to offset the brightness variations.

It should be noted that many optical distortions are due to wavelength dependent refractive index variations. These distortions cause different colors to propagate differently and cause what is known as lateral color shifts or lateral chromatic aberrations. In addition, misconvergence of different colors on the screen could occur in systems with separate microdisplay panels for different primary colors. As such, image processor 180 processes different primary colors separately. For each color component of the input image, a separate transformation function is used to pre-compensate for the distortions suffered. In terms of the transformation function in an RGB color space, this corresponds to three distortion compensation transformation functions $F_R^{-1}$, $F_G^{-1}$, and $F_B^{-1}$ corresponding to three distortion transformation functions $F_R$, $F_G$, and $F_B$. It should be noted that the separation of colors and applying different distortion correction functions separately to each color could be used for any set of primary colors, not just RGB.

Referring to FIG. 20, there is shown an illustration of the flow of digital image data, and the flow of light, in the exemplary implementation of RPDS 100. Image processor 180 obtains digital input image data and parameters for optical and geometrical distortions of the system 100 from the input interface 190. Image processor 180 then compensates for the distortions and produces digital output image data. This data is used by the micro-display device 162 to modulate the light that it transmits or reflects. This modulated light is projected and focused by the lens assembly 164 and reflected off of flat mirror 150, first mirror 130 and second mirror 140. The reflected light is then collimated by Fresnel lens 110 and redirected to be substantially perpendicular to screen 120 where the final image is displayed.

Figure 21:
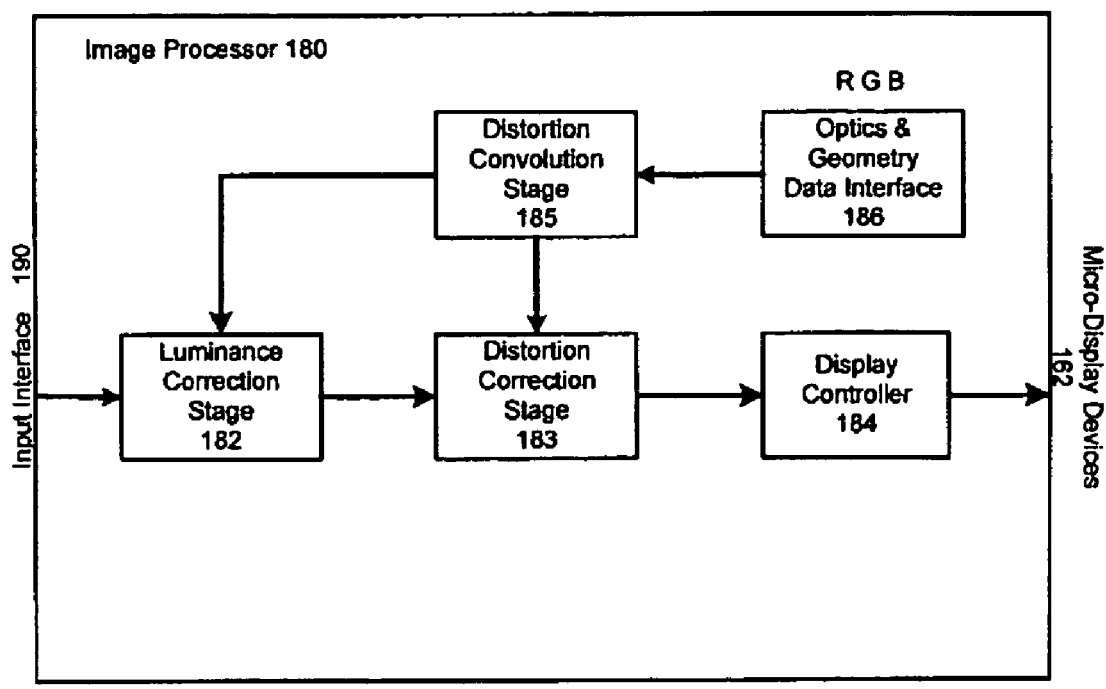
FIG. 21 is a block diagram of an example implementation of the image processor of FIG. 20.

Referring now to FIG. 21, there is shown an illustration of the structure and function of an exemplary implementation of image processor 180. Image processor 180 includes distortion correction stage 183, luminance correction stage 182, display controller 184, optics and geometry data interface 186 and distortion convolution stage 185. Convolution stage 185 obtains a parametric description of the geometric and optical distortions as well as luminance non-uniformity from optics and geometry data interface 186. Convolution stage 185 then combines the distortion parameters and produces two outputs, one of which is sent to luminance correction stage 182, and the other is sent to distortion correction stage 183. Distortion correction stage 183 warps and re-samples the input image data to compensate for geometric and optical distortions. Luminance correction stage 182 adjusts the luminance values of the distortion-corrected input image data to compensate for luminance non-uniformities.

Chromatic aberrations arise from refractive index variations which are wavelength dependent. Accordingly, image processor 180 performs distortion correction separately for all primary color components of the input image data. By separately processing different primary color components, lateral color aberrations are corrected. In these implementations, the optics and geometry data interface contains separate sets of distortion parameters for different primary color components and the sets of input image data corresponding to the different color components are processed separately by the luminance correction stage and the distortion correction stage.

The invention claimed is:

1. A rear projection display system comprising:
   a) a housing having a thickness;
   b) a screen, having a screen diagonal and a screen normal direction, positioned at a front side of the housing;
   c) a light engine placed inside the housing, having an illumination stage adapted to create a beam of light, at least one display panel adapted to modulate the beam of light to create an image, and a lens system having a focal length and adapted to project the created image forming a projected image consisting of light rays;
   d) a non-rotationally symmetric first mirror placed inside the housing and in the optical path of said projected image, having dimensions significantly smaller than said screen diagonal, and having a horizontally convex curvature, and having a vertical curvature which is a function of the focal length of said lens system, such that for shorter focal length it is more concave and less convex, and for longer focal length, it is less concave and more convex, said first mirror adapted to reflect the projected image which is projected from said lens system; and
   e) a non-rotationally symmetric second mirror, placed inside the housing and in the optical path of said projected image, having dimensions significantly larger than said first mirror and smaller than said screen diagonal and having a vertical curvature which is a function of the size of the image in the absence of said second mirror relative to the size of the screen, such that for smaller image size it is convex and for larger image size it is concave, said second mirror adapted to reflect the projected image, which is reflected off of the first mirror, onto the screen to form a viewable image.

2. The system of claim 1, further including a Fresnel lens positioned parallel to and in front of the screen, adapted to collimate light rays forming the projected image onto the screen normal direction.

3. The system of claim 2, wherein the system is configured such that the rays forming the projected image, when impinging on the Fresnel lens, have a pre-determined angular range with respect to the screen normal to allow collimation via total internal reflection, and wherein the Fresnel lens is a total-internal-reflection (TIR) Fresnel lens.

4. The system of claim 1, wherein said second mirror is significantly parallel to said screen.

5. The system of claim 1, wherein the ratio of the screen diagonal to the housing thickness is at least 10:1.

6. The system of claim 1, further wherein the light engine is a compact light engine to further reduce the housing thickness.

7. The system of claim 1, wherein the illumination stage is an LED light illumination system.

8. The system of claim 1, wherein the illumination stage is a laser light illumination system.

9. The system of claim 1, wherein the screen is on top of a chin portion in front of the housing, and wherein the chin portion has a height less than 15% of the screen diagonal.

10. The system of claim 1, wherein the second mirror has a horizontally oriented surface with a convex curvature on an upper surface that smoothly transitions by varying its degree of convex curvature to a lower surface, thereby reducing spatial distortion of the final image displayed on the screen.

11. The system of claim 10, wherein the second mirror has a small degree of horizontal convex curvature on an upper portion and a larger degree of horizontal convex curvature on a lower portion for reducing spatial distortion of the final image displayed on the screen.

12. The system of claim 1, wherein said first mirror has a horizontal curvature profile that is more convex at its bottom region and smoothly transitions to less convex at its top region.

13. The system of claim 1, wherein the lens system includes a rotationally non-symmetric lens element being shaped to compensate for defocusing caused by at least one of the first mirror and the second mirror.

14. The system of claim 1, wherein the lens assembly consists of only spherical lens elements.

15. The system of claim 1, wherein the system further comprises an image processor connected to the light engine, the image processor being adapted to correct for geometric and optical distortions in the final image.

16. The system of claim 15, wherein the image processor is adapted to correct luminance and chrominance non-uniformity in the final image.

17. The system of claim 16, wherein the image processor is adapted to perform optical distortion correction for each color component separately to eliminate lateral color distortions and misconvergence in the final image.

18. The system of claim 1, wherein the light engine is positioned generally on a top portion of the housing.

19. The system of claim 1, wherein the light engine is positioned generally on the bottom portion of the housing.

20. The system of claim 1, further including a flat mirror disposed before the first mirror, said flat mirror being adapted to rotate the image and thereby prevent the protrusion of the lens system from the housing.

* * * * *